July 19, 1927.
W. H. NICHOLLS
1,636,384
SAND MULLING AND AERATING MACHINE
Filed Nov. 9, 1925
2 Sheets-Sheet 1
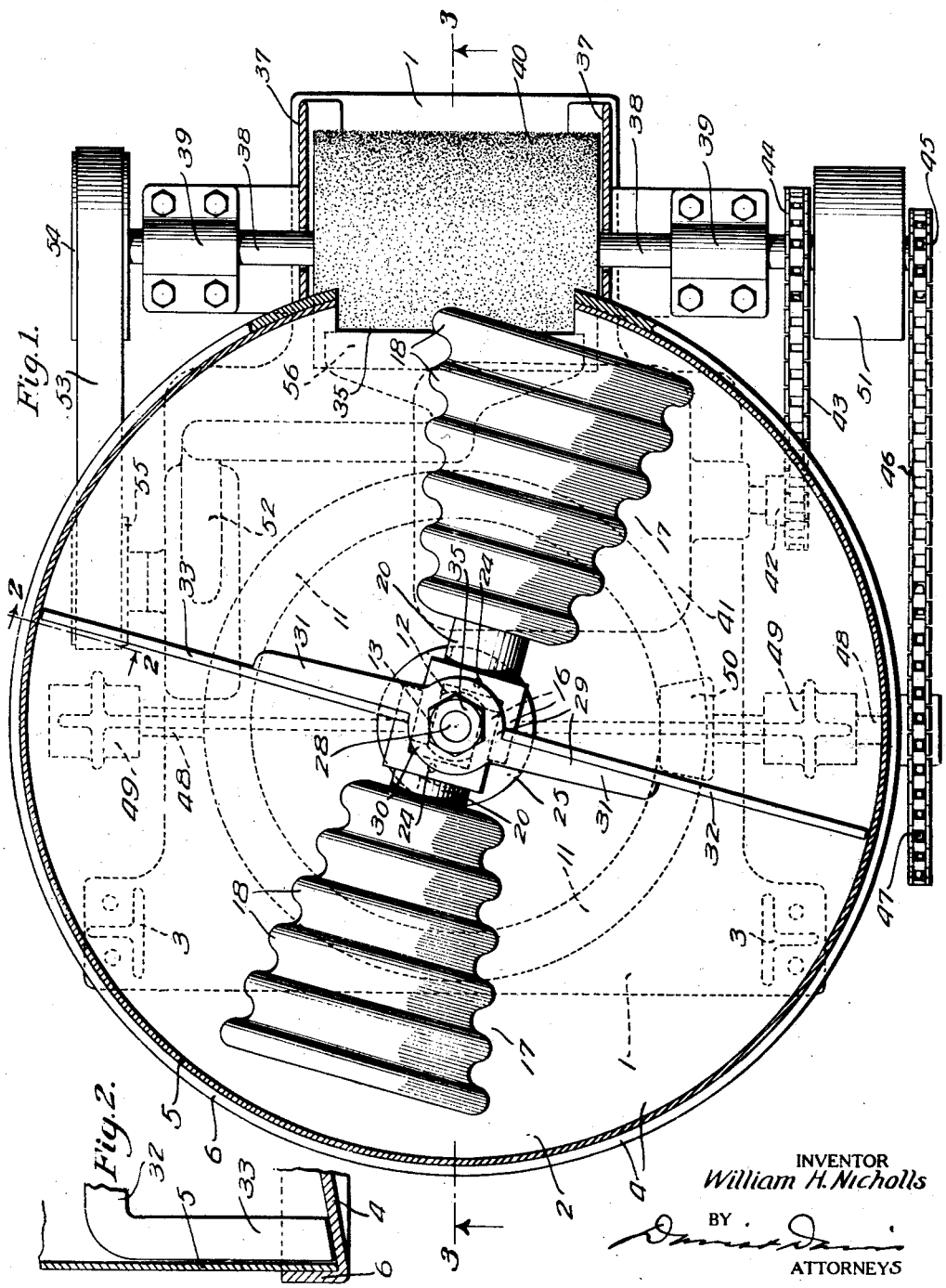
INVENTOR
*William H. Nicholls*
BY 
ATTORNEYS July 19, 1927.
W. H. NICHOLLS
1,636,384
SAND MULLING AND AERATING MACHINE
Filed Nov. 9, 1925     2 Sheets-Sheet 2
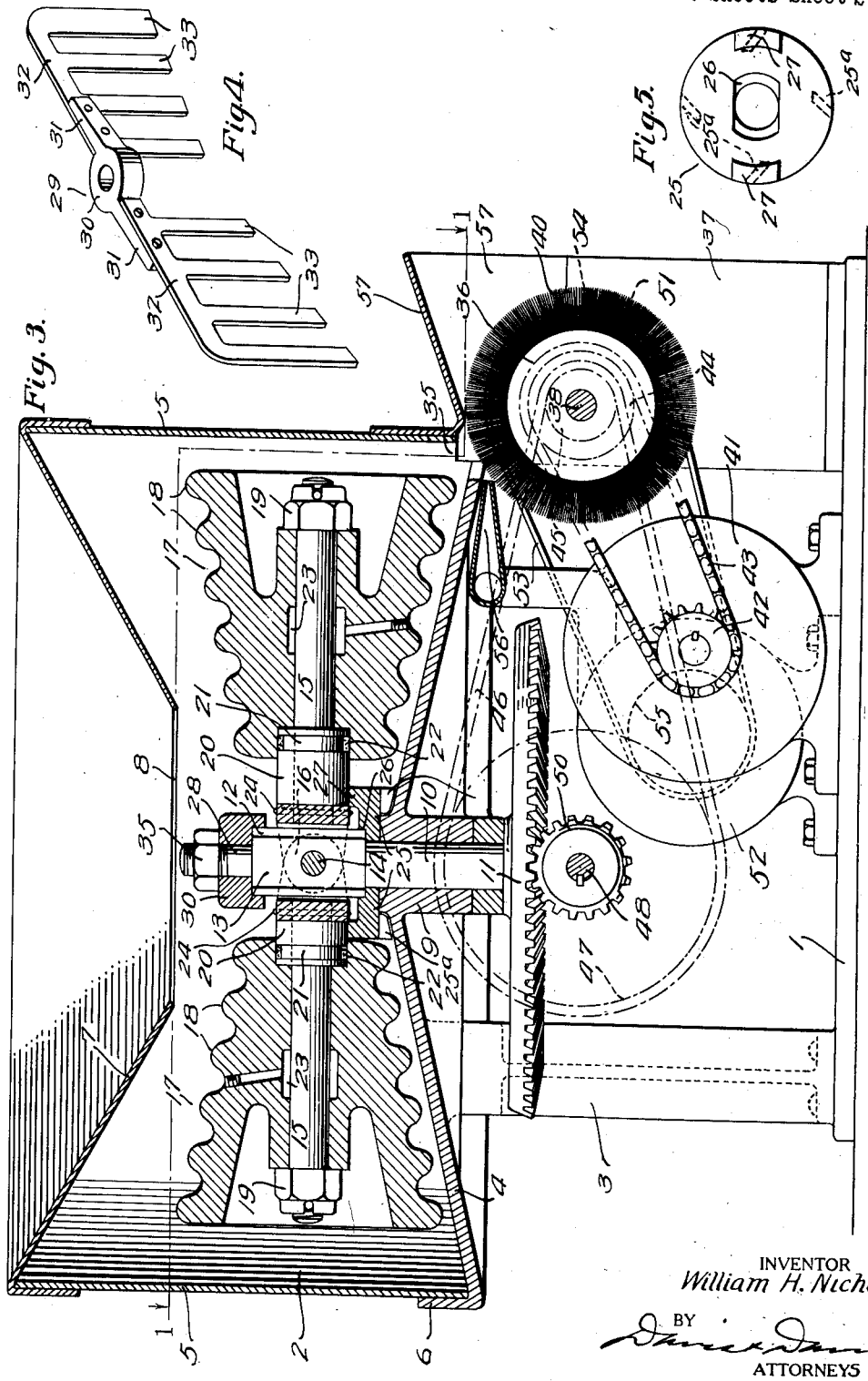
INVENTOR
William H. Nicholls
BY
ATTORNEYS Patented July 19, 1927.

1,636,384

UNITED STATES PATENT OFFICE.

WILLIAM H. NICHOLLS, OF BROOKLYN, NEW YORK.

SAND MULLING AND AERATING MACHINE.

Application filed November 9, 1925. Serial No. 67,920.

This invention relates to foundry equipment and more particularly to means for preparing the sand used in forming molds.

An object of the invention is to provide a highly efficient, continuously operating apparatus which mulls the sand, separates it finely after it has been mulled, and casts it out into the air in a diffused state to aerate it.

In the drawings:

Fig. 1 is a horizontal section taken on the line 1—1 of Fig. 3, showing the greater portion of the apparatus in plan;

Fig. 2 an enlarged detail section taken on the line 2—2 of Fig. 1;

Fig. 3 a vertical longitudinal section through the apparatus taken substantially on the line 3—3 of Fig. 1;

Fig. 4 a detail perspective view of the means for discharging the sand from the muller basin; and Fig. 5 a plan view of a detail of the apparatus.

Referring to the various parts by numerals 1 designates the base of the apparatus. A muller basin 2 is supported over the base 1 by legs 3 which are bolted at their lower ends to the base and at their upper ends to the bottom 4 of the basin. The bottom 4 is circular in plan and tapers upwardly from its outer edge toward its center to provide a conical mulling surface. The side walls of the muller basin are formed by a cylindrical cover member 5. The lower end of the cover member is fitted within an upturned annular flange 6 formed at the outer edge of the bottom 4. The upper end of the cover member is formed with a funnel or sand receiving hopper 7 having a central opening 8 through which sand is charged into the basin.

The bottom 4 of the basin is centrally formed with a vertical shaft bearing 9. This bearing extends slightly above the bottom 4 and for a material depth below it. A vertical shaft 10 extends through the bearing 9 and has a large bevel gear 11 fixed to its lower end below the bearing. The shaft 10 extends upwardly into the basin and is formed above the bearing 9 with an enlarged portion 12 having two flat faces at opposite sides thereof. Extending transversely of said enlarged portion of the shaft is a horizontal pivot pin 14. A pair of shafts 15 are hingedly connected to the pin 14 and extend outwardly therefrom in opposite directions. The inner ends of the shafts 15 are connected to U-shaped yokes 16 which straddle the enlarged portion 12 of the shaft and bear against the flat surfaces 13. These yokes are apertured to receive the pin 14 and provide a hinged connection for the shafts which allows them a slight vertical movement. A mulling roller 17 is rotatably mounted upon each shaft 15. These rollers are substantially frusto-conical in form and their outer peripheral surfaces are formed with spaced circular ribs 18. The ribs and the surfaces between them are smooth and rounded in cross section. The rollers are held upon the shafts 15 by nuts 19 threaded upon the outer ends of the shafts and located within the outer ends of the rollers which are made hollow. As will be seen in Fig. 1 the yokes 16 are so positioned as to slightly offset the shafts 15 at opposite sides of the center of the shaft 10, so that the axes of the two rollers are out of diametrical alinement.

The yokes 16 are also formed with cylindrical hub-like journal portions 20 of greater diameter than the shafts. The outer ends of these enlarged portions 20 are formed with annular grooves 21, and are inserted within bearing recesses 22 formed at the inner ends of the rollers. The grooves 21 are filled with suitable packing material to prevent the entrance of sand to the bearing surfaces of the rollers. The bearing surface of each roller is formed midway its length with an oil recess 23 which is adapted to be fed through a radial passage normally closed by a threaded plug. The hub-like portions 20 of the yokes are formed with bores to receive the inner ends of the shafts 15 and the shafts are held thereto by transverse pins 24. The hub portions 20 of the two yokes are made of unequal length in order to so space the mulling rollers that the ribs 18 thereof will travel in staggered circular paths when the shaft 10 is rotated.

Interposed between the upper end of the central bearing 9 and the enlarged portion 12 of the shaft 10, is a disc-like supporting member 25 formed with a central shaft aperture through it and with a shallow recess 26 in its upper face adapted to receive the lower end of the enlarged shaft portion 12. The recess 26 is shaped to accurately fit the flat surfaces 13 and is thereby keyed to turn with the shaft. The lower shoulder of the shaft enlargement 12 rests upon and is supported by the member 25. The supporting member 25 has a greater diameter than the upper end of the bearing 9 and is formed at its outer edges with upward extensions 27 which abut the under sides of the hub-like portions 20 of the yokes and support the shafts and rollers in a horizontal position. In this position the mulling ribs 18 of the rollers are held slightly elevated above the conical surface of the bottom 4 of the basin. The portion of the supporting disc 25 which overhangs the upper end of the bearing 9 is formed with depending, fin-like projections 25ª which are angularly disposed and so formed as to sweep out any sand which lodges beneath the overhanging portion of the disc.

The upper end of the shaft 10 is reduced and threaded as at 28. Supported upon the shoulder formed by the enlarged portion 12 of the shaft at the base of said reduced end is a sand pushing or sweeping element 29. This element is formed with a central hub portion 30 apertured to receive the reduced end of the shaft 10 and recessed at its under side to snugly fit over the upper end of the shaft enlargement 12 with its flat sides. Arms 31 are formed upon the hub 30 and extend outwardly therefrom in opposite directions. Secured to the arms 31 are outwardly extending arms 32 which are each formed with a plurality of downwardly extending sweeping or agitating members 33. The hub 30 is secured to the upper end of the shaft 10 by a nut 35 in such a position that the arms 32 are disposed at right angles to the axes of the mulling rollers. The outermost sweeping members 33 of the arms 32 are disposed in close proximity to the bottom and outer side walls of the mulling basin while the outer ends of the rollers 17 are spaced inwardly from the side walls a material distance. When the shaft 10 is rotated therefore, the rollers will be revolved in a circular orbit and the outermost sand sweeping members 33 will be revolved with the rollers, but in a concentric circular orbit outside of the roller orbit. The bottom of the basin is formed with a discharge opening 35 located outwardly of the rollers and in the path of the outermost sweepers 33. The agitating members 33 located intermediate the lengths of the two arms 32 are staggered, that is, the members upon the two different arms are located unequal distances from the center shaft 10. The agitating members upon one arm will therefore move in concentric paths located between the concentric paths of the members supported by the other arm. The members are thus adapted to agitate the sand over substantially the entire bottom area of the basin after the rollers have passed over it.

Located at one side of the mulling basin in a position to receive the sand as it is discharged through the opening 35 is a cylindrical sand-diffusing drum 36. This drum is rotatably mounted between upstanding side wall members 37 supported by the base 1 and arranged adjacent the ends of the drum. The drum is fixed to a shaft 38 which extends outwardly through the side walls 37 and is rotatably supported in bearings 39 mounted upon the outer sides of the walls 37. The cylindrical outer surface of the drum is covered with wire bristles 40 which form a brush surface.

An electric motor 41 is mounted upon the base 1 beneath the mulling basin. Mounted upon the shaft of the motor is a sprocket wheel 42 which is connected by a driving chain 43 with a sprocket wheel 44 fixed to the diffusing drum shaft 38. Another sprocket wheel 45 is also fixed to the shaft 38 and is connected by a drive chain 46 with a sprocket wheel 47 fixed to a muller drive shaft 48 located beneath the muller basin. The shaft 48 is supported by depending bearing brackets 49 mounted upon the under side of the bottom 4 of the basin. Fixed to the shaft 48 is a small driving pinion 50 which meshes with the relatively large follower gear 11 mounted upon the muller shaft 10. The motor is thus adapted to drive both the mulling rollers and the diffusing drum. A belt pulley 51 is also fixed to the drum shaft 39 and provides for the operation of the apparatus from a source of power other than the motor.

Mounted upon the base 1 of the apparatus is a centrifugal blower 52 which is adapted to be driven by the shaft 38, through a belt and pulley connection 53, 54, and 55. A pipe leads from the blower 52 to a discharge nozzle 56 located directly beneath the discharge opening 35 of the mulling basin. This nozzle has a width substantially equal to the length of the drum 36 and is directed outwardly through the brush portion substantially at a tangent to the upper side of the drum. The blower is continuously operated by the motor or other source of power along with the rest of the apparatus, and directs a continuous blast of air through the brush upon the drum. This air blast dries the sand and assists its discharge from the diffusing drum.

In the operation of the apparatus the sand is delivered into the funnel-shaped hopper and passes through the opening 8 into the mulling basin. This opening is located so that it will deliver sand to the central area only of the basin, inwardly of the rollers 17. Usually the sand has been used for previous molds, and much of it is in a lumpy condition. This sand passing into the central portion of the basin is spread out by the rollers and worked down the conical bottom of the basin to the outer edge, being thoroughly mulled or kneaded on the way by the rollers. When the mulled sand reaches the outer edge of the basin it is picked up by the outermost sweepers 33 and forced out through the discharge opening 35. The rollers are supported in a position slightly elevated from the conical bottom of the basin in order not to bear too heavily upon the sand and clog its feed through the basin. The discharged sand is delivered to the brush of the diffusing drum at one side of the shaft, carried upwardly by the drum, subjected to the blast of air from the nozzle, and cast out into the air at the opposite side of the shaft. The drum is covered by an outwardly and upwardly flaring hood 57 which properly directs the cast-off sand. The mulled sand is thoroughly broken up by the brush of the rapidly rotating drum and by the air blast and is flung off in a finely divided or diffused state. The sand is thus aerated, and is cooled and dried and deposited in a light, finely divided condition. Any steam which may have been mixed with the sand is forced out in its passage through the air.

It will be seen that I have provided an apparatus of compact unitary structure which is adapted to operate with great efficiency. A particularly desirable feature of the invention is the provision of the continuous feed of sand through the muller, the continuous delivery of the mulled sand to the diffusing drum and the continuous discharge of diffused sand from said drum.

What I claim is:

1. An apparatus of the class set forth comprising a sand mulling device adapted to mull and discharge sand continuously, in combination with power-driven sand-diffusing means disposed to directly receive the mulled sand discharged from said device and adapted to divide it finely and cast it out into the air continuously.

2. An apparatus of the class set forth comprising a sand mulling device adapted to mull and discharge sand continuously in combination with power-driven sand-diffusing means disposed to receive the mulled sand discharged from said device and adapted to divide it finely and cast it out into the air continuously, and means to direct a continuous blast of air through the sand as it is discharged from the sand-diffusing means.

3. An apparatus of the class set forth comprising a sand mulling basin, in combination with power driven sand-diffusing means, and means to automatically deliver sand as it is mulled from said basin to said diffusing means, the diffusing means being adapted to finely divide the mulled sand and cast it out into the air.

4. An apparatus of the class set forth comprising a sand mulling device including a mulling basin formed with a sand discharge opening, and a rotatable power-driven drum provided with a brush-like peripheral surface disposed to receive the sand discharged from said basin opening and adapted to divide it finely and cast it out into the air as the drum is rotated.

5. An apparatus of the class set forth and comprising a sand mulling device including a mulling basin formed with a central elevated receiving hopper having a delivery opening through which sand will be delivered centrally into the basin and an outwardly and downwardly inclined bottom and an unobstructed peripheral discharge opening at one side and extending to the peripheral edge of the bottom, rotatable means within the basin for mulling the sand and delivering it constantly and in uniform quantities to the discharge opening, a rotatable power-driven drum provided with radial contact elements on its peripheral surface and disposed below the discharge opening to directly receive the entire quantity of sand as it drops from said basin opening and to divide it finely and cast it out into the air as the said drum is rotated, and means to drive the drum at a speed sufficient to prevent accumulation of sand on the drum.

6. An apparatus of the class set forth and comprising a sand mulling device including a mulling basin formed with an outwardly and downwardly inclined bottom and an unobstructed peripheral discharge opening at one side and extending to the peripheral edge of the bottom, means within the basin for mulling the sand and delivering it uniformly and constantly to the discharge opening, a rotatable power-driven drum provided with a brush-like peripheral surface disposed below the discharge opening to receive the sand discharged from said basin opening and to divide it finely and cast it out into the air as the said drum is rotated, the said brush-like surface being free and unobstructed in its rotation, and means to direct a blast of air through the brush in the direction of the discharge of the sand therefrom.

7. An apparatus of the class set forth comprising a sand mulling device including a mulling basin formed with a sand discharge opening, a rotatable power driven drum provided with a brush-like peripheral surface disposed to receive the sand discharged from said basin opening and adapted to divide it finely and cast it out into the air as the drum is rotated, and means to direct a blast of air through the sand as it is discharged from the drum.

8. A device of the class set forth comprising a sand mulling device adapted to mull and discharge sand continuously; a rotatably mounted sand-diffusing drum provided with a brush-covered peripheral surface disposed to receive the sand discharged from said mulling device, finely divide it and cast it out into the air as the drum is rotated; an air compressor; an air discharge nozzle connected to said compressor and mounted to direct a blast of air through said brush in the direction of the discharge of sand therefrom; and power transmission means to drive the mulling device, the drum and the compressor all from the same power source.

In testimony whereof I hereunto affix my signature.

WILLIAM H. NICHOLLS.